(12) United States Patent
Goodsitt et al.

(10) Patent No.: US 12,061,862 B2
(45) Date of Patent: *Aug. 13, 2024

(54) SYSTEMS AND METHODS FOR GENERATING CUSTOMIZED CONTENT BASED ON USER PREFERENCES

(71) Applicant: Capital One Services, LLC, McLean, VA (US)

(72) Inventors: Jeremy Goodsitt, Champaign, IL (US); Anh Truong, Champaign, IL (US); Fardin Abdi Taghi Abad, Seattle, WA (US); Mark Watson, Sedona, AZ (US); Reza Farivar, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/899,083

(22) Filed: Jun. 11, 2020

(65) Prior Publication Data

US 2021/0390247 A1 Dec. 16, 2021

(51) Int. Cl.
*G06F 40/103* (2020.01)
*G06F 40/16* (2020.01)
(Continued)

(52) U.S. Cl.
CPC ............ *G06F 40/16* (2020.01); *G06F 40/103* (2020.01); *G06F 40/186* (2020.01); *G06N 20/00* (2019.01);
(Continued)

(58) Field of Classification Search
CPC ........ G06N 3/08; G06N 20/00; H04N 21/812; H04N 5/272; H04N 21/4318;
(Continued)

(56) References Cited

U.S. PATENT DOCUMENTS

| 7,028,072 B1 | 4/2006 | Kliger et al. |
| 10,685,057 B1 * | 6/2020 | Chavez ............... G06F 16/9535 |

(Continued)

OTHER PUBLICATIONS

Jason Brownlee, "How to Develop a Pix2Pix GAN for Image-to-Image Translation", published: Dec. 13, 2019, publisher: Machinelearning Mastery.co,m pp. 1-31) (Year: 2019).*

(Continued)

*Primary Examiner* — Wilson W Tsui
(74) *Attorney, Agent, or Firm* — HUNTON ANDREWS KURTH LLP

(57) ABSTRACT

Embodiments disclosed herein provide for dynamically modifying image and/or video content based on user preferences. Embodiments provide a server, a database containing user preference information and one or more content templates, and a content generator comprising a plurality of generative adversarial networks, wherein each generative adversarial network is associated with a corresponding style transfer, and the content generator is configured to apply one or more style transfers to a base image to convert the base image into a desired style. Once created, the customized content is sent to a client device to for display.

20 Claims, 6 Drawing Sheets

(51) Int. Cl.
*G06F 40/186* (2020.01)
*G06N 20/00* (2019.01)
*G06Q 30/0241* (2023.01)
*G06Q 30/0251* (2023.01)

(52) U.S. Cl.
CPC ..... *G06Q 30/0251* (2013.01); *G06Q 30/0277* (2013.01)

(58) Field of Classification Search
CPC .. G06F 16/9535; G06F 16/248; G06F 16/435; G06F 16/78; G06F 16/7837; G06F 40/16; G06F 20/00; G06F 40/103; G06F 40/186; G06Q 30/0251; G06Q 30/0277
See application file for complete search history.

(56) References Cited

U.S. PATENT DOCUMENTS

| | | | |
|---|---|---|---|
| 10,699,161 B2* | 6/2020 | Malur Srinivasan | G06K 9/6284 |
| 10,904,638 B2* | 1/2021 | Lee | H04N 21/235 |
| 2001/0053275 A1* | 12/2001 | Adachi | G11B 27/034 386/290 |
| 2006/0026067 A1 | 2/2006 | Nicholas et al. | |
| 2007/0130156 A1* | 6/2007 | U. Tenhunen | G06F 8/60 |
| 2007/0288454 A1* | 12/2007 | Bolivar | G06Q 30/02 707/999.005 |
| 2008/0005655 A1 | 1/2008 | Sankaran et al. | |
| 2008/0249833 A1 | 10/2008 | Ali et al. | |
| 2009/0037279 A1 | 2/2009 | Chockalingam et al. | |
| 2009/0187483 A1* | 7/2009 | You | G06Q 30/0254 705/14.52 |
| 2009/0259941 A1* | 10/2009 | Kennedy, Jr. | H04N 21/23424 715/719 |
| 2013/0325869 A1 | 12/2013 | Reiley et al. | |
| 2014/0075289 A1 | 3/2014 | Brant | |
| 2015/0006299 A1 | 1/2015 | Efrati et al. | |
| 2017/0180435 A1 | 6/2017 | Edwards | |
| 2017/0330246 A1 | 11/2017 | Choe et al. | |
| 2017/0351952 A1 | 12/2017 | Zhang et al. | |
| 2018/0012630 A1* | 1/2018 | Thomée | G06V 20/00 |
| 2018/0014066 A1* | 1/2018 | Berman | H04N 21/439 |
| 2018/0075581 A1 | 3/2018 | Shi et al. | |
| 2018/0122048 A1 | 5/2018 | Wang et al. | |
| 2019/0026274 A1* | 1/2019 | Deng | G06V 20/46 |
| 2019/0095959 A1* | 3/2019 | Yu | G06Q 30/0244 |
| 2019/0205946 A1* | 7/2019 | Mellina | G06N 3/0472 |
| 2019/0392487 A1* | 12/2019 | Duke | G06N 3/08 |
| 2020/0169785 A1 | 5/2020 | Goodsitt et al. | |

OTHER PUBLICATIONS

Karras et al, "A Style-Based Generator Architecture for Generative Adversarial Networks", published: Mar. 2019, publisher: arxiv.org, pp. 1-12. (Year: 2019).*

Author: Saeedi et al., Title: "Multimodal Prediction and Personalization of Photo Edits with Deep Generative Models", published: 2018, publisher: PMLR, vol. 84, pp. 1-9. (Year: 2018).*

Gatys, L.A. et al.; "A Neural Algorithm of Artistic Style", Werner Reichardt Centre for Integrative Neuroscience . . . , arXiv:1508.06576v2 [cs.CV] Sep. 2, 2015.

Johnson, J. et al.; "Perceptual Losses for Real-Time Style Transfer and Super-Resolution", Department of Computer Science, Stanford University, arXiv:1603.08155v1 [cs.CV] Mar. 27, 2016.

Pfau, D. et al.; "Conneting Generative Adversarial Networks and Actor-Critic Methods", Google DeepMind, arXiv:1610.01945v3 [cs.LG] Jan. 18, 2017.

Zhu, J. et al.; "Unpaired Image-to-Image Translation using Cycle-Consistent Adversarial Networks", Berkeley Al Research (BAIR) laboratory, UC Berkeley; arXiv:1703.10593v4 [cs.CV] Feb. 19, 2018.

Bansal, H. et al.; "Understanding and Implementing CycleGAN in TensorFlow", CycleGAN, https://hardikbansal.github.io/CucleGANBlog.

Zhang et al. "Multi-Style Generative Network for Rea-time Transfer" Nov. 16, 2017, Department of Electrical and Computer Engineering, Rutgers University (2017).

Bharadhwaj et al., "RecGAN: Recurrent Generative Adversarial Networks for Recommendation Systems", Association for Computing Machinery, ACM ISBN 978-1-4503-5901-Jun. 18, 2010, Oct. 2-7, 2018 (2018).

Elkahky et al., "A Multi-View Deep Learning Approach for Cross Domain User Modeling in Recommendation Systems", WWW 2015, May 18-22, 2015, Florence, Italy, ACM 978-1-4503-3469-Mar. 15, 2005, (2015).

Adam Kosiorek, "Attention in Neural Networks and How to Use It", Oct. 14, 2017, retrieved from: http://akosiorek.github.io/ml/2017/10/14/visual-attention.html, 14 pages.

Abhishek Singh, "Brief Introduction to Attention Models", Sep. 6, 2019, Towards Data Science, retrieved from: https://towardsdatascience.com/attention-networks-c735befb5e9f.

Ashish Vaswani et al, "Attention is All You Need", 31st Conference on Neural Information Processing Systems (NIPS 2017)), 11 pages.

* cited by examiner

System 200

Server 50

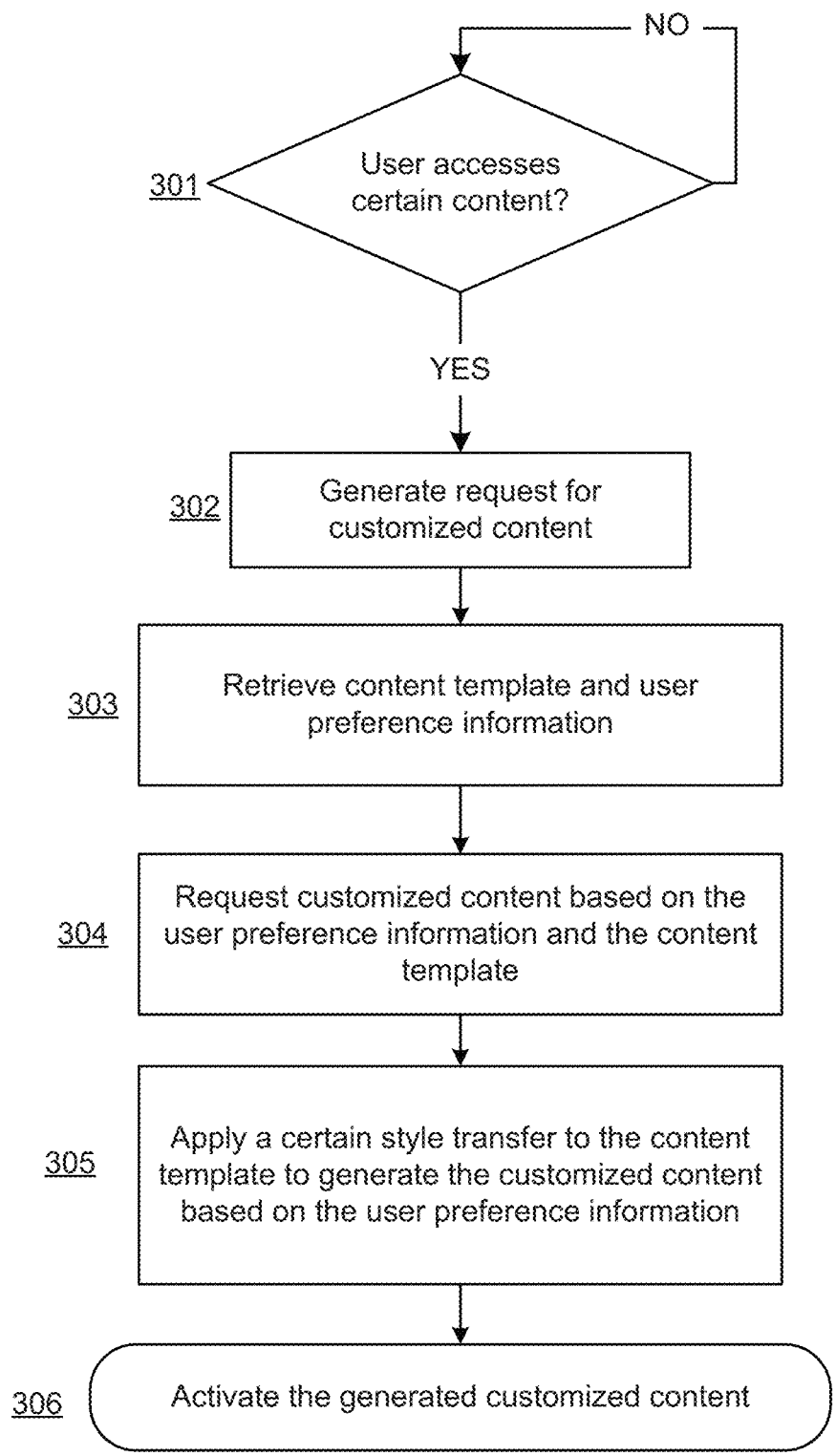

SYSTEMS AND METHODS FOR GENERATING CUSTOMIZED CONTENT BASED ON USER PREFERENCES

TECHNICAL FIELD

The present application relates to a system and method for dynamically modifying image and/or video content to generate customized content based on user preferences.

BACKGROUND

Targeted advertising, as its name implies, refers to the targeting of advertising to specific audiences. For example, children may prefer anime or cartoon advertisements. On the other hand, adults might prefer a live-action advertisement. Currently, online advertisers are able to target their advertisements to a particular user based on the user's personal preference or information. Specifically, online advertisers provide targeted advertisements to a particular user based on the user information collected and stored by the user's web browser. In particular, the online advertisers access the information stored in browser cookies. A browser cookie is a small piece of information provided by the website to the browser as the user browses the website. Further, browser cookies are generally stored by the browser at the user's computer. Browser cookies can store information regarding the user's browser activity as well as any personal information entered by the user at the website. As such, based on the browser cookie, the online advertiser can determine a lot of specific information about a user, such as the user's age, location, etc. Then, based on such information, the online advertiser may provide a targeted advertisement to the user. For example, if it is determined by the online advertiser that the user is a child, the provided advertisement may be either a cartoon, anime, or some other computer-animated content. Currently, however, the provided advertisements have to be pre-made. Further, once they're made, there is currently no means of modifying the content of the advertisements after such user preference information is determined.

Accordingly, there is a need for dynamically generating image and video content based on specific user preferences.

BRIEF DESCRIPTION OF THE DRAWINGS

FIG. 3 illustrates an example embodiment of a method for dynamically modifying image and video content.

DESCRIPTION OF EMBODIMENTS

Figure 1A:
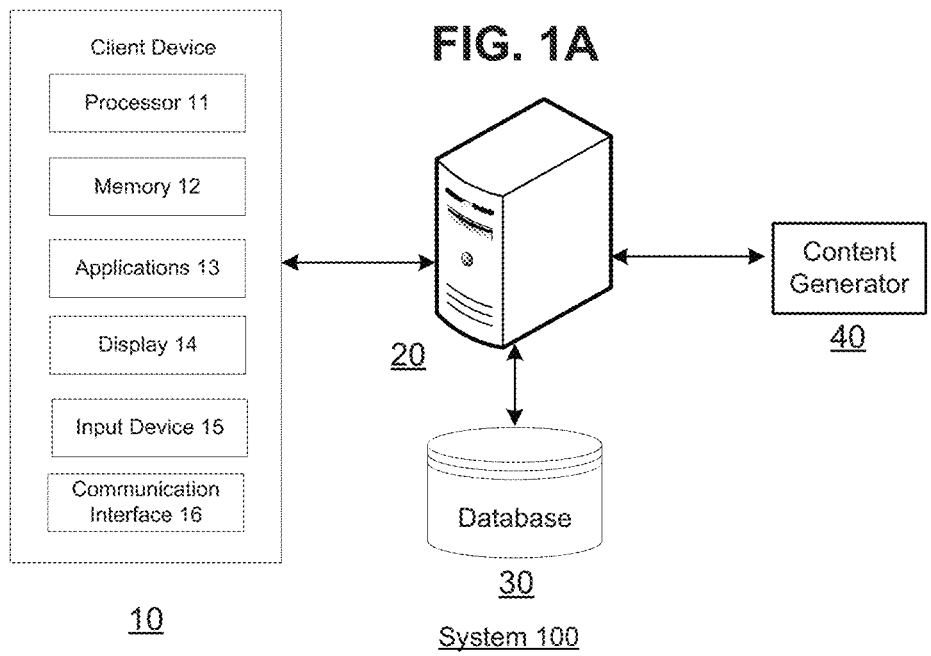
FIG. 1A illustrates an example embodiment of a system employing dynamic modification of image and video content.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide a system and method for dynamically modifying image and/or video content based on user preferences. The systems and methods herein address at least one of the problems discussed above.

According to an embodiment, a system for dynamically modifying content based on user preferences, the system comprising: a client device; a server; a database containing user preference information and one or more content templates; and a content generator comprising a plurality of generative adversarial networks, wherein: each generative adversarial network is associated with a corresponding style transfer, and the content generator is configured to apply one or more style transfers to a base image to convert the base image into a desired style; wherein, upon receipt of a request for customized content associated with a user, the server is configured to: query the database for user preference information associated with the user and a content template, and request the customized content from the content generator based on the user preference information and the content template; and upon receipt of the request from the server, the content generator is configured to: retrieve a style transfer model from the database; and apply the style transfer model to the content template to generate the customized content based on the user preference information.

According to an embodiment, a method for dynamically modifying content based on user preferences, the method comprising: generating, at a processor, a request for customized content from a server; querying, with the server, a database for user preference information and a content template for the customized content; requesting, with the server, the customized content from a content generator based on the user preference information and the content template; retrieving, by the content generator, a style transfer model from the database, and applying, at the content generator, the style transfer model to the content template to generate the customized content based on the user preference information.

According to an embodiment, a system for dynamically modifying content based on user preferences, the system comprising: a mobile device; and a server; wherein the mobile device includes a processor, wherein the processor is configured to generate a request for customized content from the server upon determining that a user accessed certain content at the mobile device; wherein the server includes a plurality of generative adversarial networks, wherein each generative adversarial network is associated with a corresponding style transfer, wherein the server is configured to retrieve and apply a style transfer model to a content template to generate the customized content based on user preference information.

FIG. 1A illustrates an example embodiment of a system employing dynamic modification of image and video content. In an embodiment, as depicted in the figure, a system 100 includes a client device 10, a server 20, a database 30, and a content generator 40. While FIG. 1A shows a client device 10, a server 20, a database 30, and a content generator 40, the present disclosure is not limited to a specific number of devices, and it is understood that the system 100 can include one or more of each.

In an embodiment, the client device 10 may be a mobile device, e.g., smart phone, tablet, personal computer, etc. It is understood that client device 10 is not limited to these examples, and client device 10 can be any combination of one or more electronic devices selected from the group of smartphones, laptop computers, desktop computers, tablet computers, personal digital assistants, wearable devices, smartcards, thin clients, fat clients, servers, Internet browsers, and customized software applications. It is further understood that the client devices can be of any type of electronic device that supports the communication and display of data and user input, including commercial and industrial devices. Additional exemplary embodiments include, without limitation, automated teller machines (ATMs), kiosks, checkout devices, registers, navigation devices (e.g., Global Positioning System devices), music players, audio/visual devices (e.g., televisions and entertainment systems), electronic devices integrated in vehicles (e.g., dashboard displays, climate controls, sound systems), and industrial machinery.

The client device 10 may include a processor 11. In an embodiment, the processor 11 is suitable for the execution of a computer program and may include, by way of example, both general and special purpose microprocessors, and any one or more processors of any kind of digital computer. The processor 11 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The client device 10 may include a memory 12. The memory 12 can be a read-only memory, write-once read-multiple memory or read/write memory, e.g., RAM, ROM, and EEPROM, and client device 10 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once a write once/read-multiple memory is programmed, it cannot be rewritten, but it can be read many times. A read/write memory can be programmed and re-programed many times after leaving the factory. It can also be read many times. The memory 12 can be configured to store one or more software applications and other data (e.g., user credentials, preferences, operational information).

The client device 10 may include one or more software applications 13 comprising instructions for execution on the client device 10. In some examples, client device 10 can execute the one or more software applications 13, that enable, for example, network communications with one or more components of system 100, transmission and/or receipt of data, and performance the functions described herein. Upon execution by the processor 11, the one or more software applications 13 can provide the functions described in this specification, specifically to execute and perform the steps and functions described herein. Such processes can be implemented in software, such as software modules, for execution by client devices or other machines. The one or more software applications 13 can be written in a source code language (e.g., C, C++, Python, Java) and compiled into binary code for execution.

The one or more software applications 13 can provide one or more graphic user interfaces (GUIs) through which user can view and interact with other components and devices within system 100. The GUIs can be formatted, for example, as web pages in HyperText Markup Language (HTML), Extensible Markup Language (XML) or in any other suitable form for presentation on a display device depending upon applications used by users to interact with the system 100. For example, GUIs can comprise one or more objects or elements displayed by the client device 10. Exemplary objects or elements include, without limitation, widgets, windows, window borders, buttons, icons, menus, tabs, scroll bars, zooming tools, dialog boxes, check boxes, radio buttons, hyperlinks, and text. The interface can be displayed by, e.g., an application installed on or a webpage loaded by the client device 10. The user can interact with the one or more objects or elements when using the interface in various ways via input device 15, including without limitation moving and/or clicking a mouse or other input device, clicking a button, entering text, selecting text, editing text (e.g., adding text, changing text, or deleting text), editing the format of text (e.g., bolding, italicizing, underlining, increasing/decreasing text size, changing a font, or removing formatting), making selections from a menu, checking a box, unchecking a box, turning a feature or functionality on, turning a feature or functionality off, using a scroll bar, and the like. It is understood that example embodiments of user interactions described herein can be applied to any interaction and sequence of interactions, including the foregoing examples. A reference to a specific action, such as clicking a button or selecting a link, is understood to be non-limiting and can refer to any interaction and sequence of interactions, including the foregoing examples.

The client device 10 can further include a display 14 and an input device 15. The display 14 can be one or more of any type of device for presenting visual information such as a computer monitor, a flat panel display, a touch screen display, a kiosk display, an ATM display, and a mobile device screen. Exemplary displays can include, without limitation, at least one selected from the group of liquid crystal displays, light-emitting diode displays, plasma panels, and cathode ray tube displays. The input device 15 can include one or more of any device for entering information into the client device 10 that is available and supported by the client device 10. Exemplary input devices can include, without limitation, one or more selected from the group of a keyboard, a mouse, a touch screen, a stylus, a joystick, a trackball, a dial, and an eye gaze tracker, a joypad, a pointing stick, a touch pad, a three-dimensional mouse, a light pen, a dial, a knob, a gesture recognition input device, a sip-and-puff input device, a microphone, a digital camera, a video recorder, and a camcorder. Input device 15 can be used to enter information and interact with the client device 10 and by extension with the systems and software described herein.

Client device 10 can further include a communication interface 16 having wired and/or wireless data communication capabilities. These capabilities can support data communication with a wired or wireless communication network, including the Internet, a cellular network, a wide area network, a local area network, a wireless personal area network, a wide body area network, any other wired or wireless network for transmitting and receiving a data signal, or any combination thereof. This network can include, without limitation, telephone lines, fiber optics, IEEE Ethernet 902.3, a wide area network, a local area network, a wireless personal area network, a wide body area network or a global network such as the Internet. The communication interface 16 can also support a short-range wireless communication interface, such as near field communication, radio-frequency identification, and Bluetooth.

Further, the client device 10 is configured to receive specific user input. For example, the client device 10 may be configured to access and browse content such as a website, a television channel, an Internet stream, or a video game. Further, in an embodiment, after the user accesses said content, the client device 10 may provide additional content to the user, e.g., an advertisement. The additional content may be activated automatically by the client device 10 (e.g., via processor 11). In another embodiment, the additional content may be activated intentionally by the user (e.g., by intentionally "playing" the additional content on the client device 10). Further, in an embodiment, the additional content may be provided to the user via a display and speakers. In an embodiment, the display may be a liquid crystal display (LCD), e.g., thin-film-transistor (TFT) LCD, in-place switching (IPS) LCD, capacitive or resistive touch-screen LCD, etc. Further, the display may also be an organic light emitting diode (OLED), e.g., active-matrix organic light emitting diode (AMOLED), super AMOLED, etc. Client device 10 may be in communication with one or more servers 20, and may operate as a respective front-end to back-end pair with server 20. Client device 10 may transmit, for example from a mobile device application executing on client device 10, one or more requests to server 20. The one or more requests may be associated with retrieving data from server 20.

The server 20 may be a back-end component and may be configured to interact with each of the client device 10, the database 30, and the content generator 40 to provide generated content to display at the client device 10. The server 20 can comprise a processor, a memory, and a communication interface. The server 20 can be a dedicated server computer, such as bladed servers, or can be personal computers, laptop computers, notebook computers, palm top computers, network computers, mobile devices, wearable devices, or any processor-controlled device capable of supporting the system 100. In some examples, the server 20 can be one or more client devices 10. While FIG. 1 illustrates a single server 20, it is understood that other embodiments can use multiple servers or multiple computer systems as necessary or desired to support the users and can also use back-up or redundant servers to prevent network downtime in the event of a failure of a particular server.

Server 20 may receive the one or more requests from client device 10. Based on the one or more requests from client device 10, server 20 may be configured to retrieve the requested data from one or more databases 30 via one or more database 30 queries. Based on receipt of the requested data from one or more databases 30, server 20 may be configured to transmit the received data to client device 10, the received data being responsive to one or more requests, after transmitting and receiving requested data from content generator 40. For example, the server 20 may receive a request for customized content from the client device 10, query the database 30 for user preference information and a content template, and request customized content from the content generator 40 based on the user preference information and the content template. Further, the server 20 may also receive the generated customized content from the content generator 40, and then transmit the generated customized content to the client device 10.

The database 30 can comprise one or more databases. Exemplary databases can include, without limitation, relational databases, non-relational databases, hierarchical databases, object-oriented databases, network databases. The database 30 can be centralized or distributed. In some examples, the database 30 can be contained in the server 20, and in other examples the database can be stored outside of the server 20 but in data communication with the server 20. In some examples, the database 30 can be in data communication with the client device 10 and/or the content generator 40. The database 30 can be implemented in a database programming language. Exemplary database programming languages include, without limitation, Structured Query Language (SQL), MySQL, HyperText Markup Language, JavaScript, Hypertext Preprocessor Language, Practical Extraction and Report Language, Extensible Markup Language, and Common Gateway Interface. Queries made to the database 30 can be implemented in the same database programming language used to implement database 30. For example, if database 30 is an SQL database, then queries made to the database can be made in SQL (e.g., SELECT column1, column2 FROM table1, table2 WHERE column2='value'). It is understood that database 30 can be implemented in any database programming language and that the programming implementation of the query can be adjusted as necessary for compatibility with the database 30 and to reflect the particular information to be queried.

In an embodiment, the database 30 is configured to store user preference and personal information. For example, the database 30 is configured to store browser cookies. Further, the database 30 is also configured to a plurality of content templates to be used in generating the additional content with the content generator 40. In an embodiment, the content template may be a live video. In another embodiment, the content template may be a bare-bones image. For example, the content template may be an image that only includes stick figures. In some examples, user input via client device 10 may be associated with one or more parameters for database 30 querying of the user preference information. Without limitation, the one or more parameters may include at least one selected from the group of location data, theme data (e.g. Southwestern, Western, medieval, black and white coloration, stick figures, live action, animated cartoons, cityscape, voice accents), ethnicity data, age data, gender data, playback data (e.g., normal speed, fast speed, slow speed, slow motion, with or without sound, increased/decreased sound, increased/decreased brightness, increased/decreased contrast), and/or any combination thereof. It is understood that the parameters are not limited to those previously-listed and that the present disclosure encompasses additional parameters not expressly recited herein. In some examples, the one or more parameters may be displayed on client device 10 after selection of a button, such as a click button, via an interface. In other examples, the one or more parameters may be displayed on client device 10 from a drop-down menu interface. In other examples, a free form text entry field from an interface may be presented to the user on client device 10, with user input parsed for one or more keywords for the database 30 query. The user may directly select parameters or may make other inputs that are associated with the parameters.

The content template may be associated with the one or more parameters. For example, if a Southwestern theme was selected or otherwise provided as, or associated with, user input via client device 10, one or more associated keywords may be queried in the database 30 to provide content that is, responsive to the selection, analogous to the Southwestern theme. In another example, selected input of a Western style genre would result in the server 20 and/or database 30 formulating a query based on the selected input. A user may provide input, via client device 10, which may be parsed into a summary of their interests, and keywords associated with this summary may be looked up for matching as part of the database 30 query.

In an embodiment, the content generator 40 is configured to generate the additional content based on the content template and the user information. The content generator 40 may be implemented in one or more software applications executing on a client device, a server, or other device. Upon execution by a processor, the content generator 40 can provide the functions described in this specification, specifically to execute and perform the steps and functions described herein. Such processes can be implemented in software, such as software modules, for execution by client devices or other machines. The one or more software applications comprising the content generator can be written in a source code language (e.g., C, C++, Python, Java) and compiled into binary code for execution.

The content generator 40 may comprise one or more algorithms which are configured to apply a selected style transfer to a base image and convert it into a desired style. The one or more algorithms of the content generator 40 may be configured to retrieve one or more style transfer models, including but not limited to the desired style transfer from a database, such as database 30, and apply the style transfer to the received input image so as to output the result of the model that processed the input image. In other examples, the content generator 40 may be configured to generate the requested content. For example, the content generator 40 may comprise one or more style transfer models. In some examples, the style transfer model may be pre-built and may be retrieved from the database 30. Under either example, the content generator 40 may be configured to return the requested customized content to the server 20, which may be configured to return the customized content to client device 10. In particular, the content generator 40 is configured to generate the additional content by applying a certain style transfer, of a plurality of style transfers, to the content template based on user information, wherein each style transfer is associated with distinct user preference information. In some examples, a style transfer may modify the style of an object while still preserving its content. For example, the distinct user preference information may correspond to an age range of a user, e.g., children, adults, etc. The style transfers may be transformed from a template drawing, such as one or more stick figures, to one or more other types, such as one or more animated cartoons. In an embodiment, the style transfers uniquely transform a content template to another format, e.g., (i) stick figures to cartoons, (ii) stick figures to anime, or (iii) stick figures to live-action. Similarly, the style transfers may also transform a live-action content template to a cartoon, anime, or a slightly different version of the live-action content template (e.g., the generated content may include different colors, images, etc.). For example, a plurality of style transfers may be associated with different hair colors or facial hair. Therefore, a style transfer associated with children may convert a content template to a cartoon or anime, while a style transfer associated with adults may convert the content template to a live-action advertisement.

In some examples, the content generator 40 can be implemented using machine learning. For example, the content generator 40 can comprise one or more generative adversarial networks (GANs).

In an embodiment, each of the style transfers is trained with a distinct pre-built model. Specifically, each of the style transfers are trained with distinct generative adversarial networks. In an embodiment, a GAN includes a generative network and a discriminator network. In an embodiment, the generative network creates new content and the discriminator network determines if the content generated by the generative network is a real image or the generated content. Neural networks, which may or may not contain GANs, may be utilized for style transfer and may be associated with one or more style transfers. In some examples, only the generative network of the GAN may be configured for style transfer. In such examples, the discriminator network is not needed. After a period of time, the generative network is able to generate content that can deceive the discriminator network into determining that the generated content is a real image. In an embodiment, the content determined to be real is then output to be provided back to the client device 10. In an embodiment, the GAN can be trained on paired or unpaired data. In a paired dataset, every inputted image (e.g., stick figures) is manually mapped to an image in a target domain (e.g., cartoon, anime, live-action, etc.). Therefore, with a paired dataset, the generative network takes an input and maps the input image to an output image, which must be close to its mapped counterpart. However, with unpaired datasets, a cycle-consistent GAN may be utilized. With cycle-consistent GANs, after a first generative network transforms a given image from a first domain (e.g., stick figures) to a target domain (e.g., cartoon, anime, live-action, etc.), a second generative network then transforms the newly generated image from the target domain to the first domain. By transforming the generated image from the target domain to the first domain, a meaningful mapping between the input and output images can be defined for unpaired datasets.

Figure 1B:
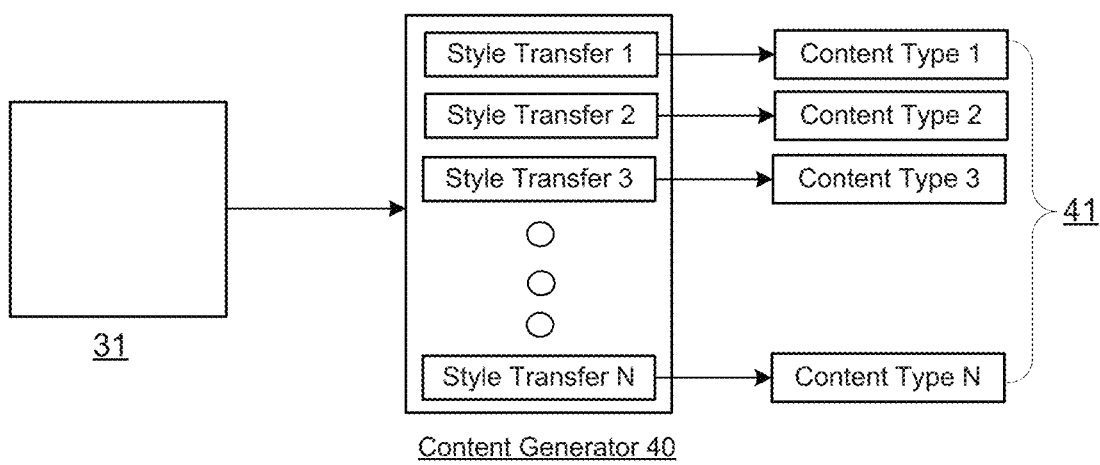
FIG. 1B illustrates an example embodiment of the content generator depicted in FIG. 1A.

FIG. 1B illustrates an example embodiment of the content generator depicted in FIG. 1A. As depicted in the figure, the content generator 40 receives a content template 31 in order to generate a plurality of content types 41 (e.g., cartoon, anime, live-action, blonde hair color, brunette hair color, gray hair color, mustache, goatee, variety of color palette schemes, etc.). Specifically, the content generator 40 applies a certain style transfer (e.g., style transfer 1, style transfer 2, style transfer 3, . . . style transfer N) to the content template 31 in order to generate a corresponding content type 41 (e.g., content type 1, content type 2, content type 3, . . . content type N). In an embodiment, the content template 31 can be a video or an image. If the content template is an image, a style transfer is applied to that individual image. However, if the content template is a video, the style transfer may be applied to each individual video frame of the content template. For example, the style transfer can be applied to each video frame consecutively. However, in another embodiment, the style transfer can be applied simultaneously to a number of video frames. For example, in an embodiment, because each frame transformation image can be considered independent of the other image transformation processes within the video, if multiple parallel systems are running with the same style transfer, each individual frame can be processed in parallel. In an embodiment, each of the style transfers 1 to N are associated with a distinct GAN. However, in another embodiment, each of the style transfers 1 to N can be associated with multiples GAN. In other words, a particular style transfer can be composed of a series of other style transfers.

In other examples, the content generator 40 can comprise one or more neural networks, such as convolutional neural networks ("CNN") or recurrent neural networks ("RNN"), that function to generate customized content and apply style transfers. The one or more neural networks can be implemented in a client device or a server and include one or more software applications. A CNN can include one or more convolutional layers (e.g., often with a sub sampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment.

Each sequence can produce an error as the sum of the deviations of all target signals from the corresponding activations computed by the network. For a training set of numerous sequences, the total error can be the sum of the errors of all individual sequences.

In some examples, one or more attention networks can be utilized. In an attention network, a wider view of input sequences can be taken by a neural network. By doing so, a broader view of inputs can be taken and a focus can be applied to a particular input or inputs. If, for example, a subset of the received inputs is a focus, then an attention vector and an attention glimpse can be created for a parameterized attention network. In some embodiments, soft attention can be utilized for multiple features with a mask of values, and in other embodiments, hard attention constraining those values can be used.

Figure 1C:
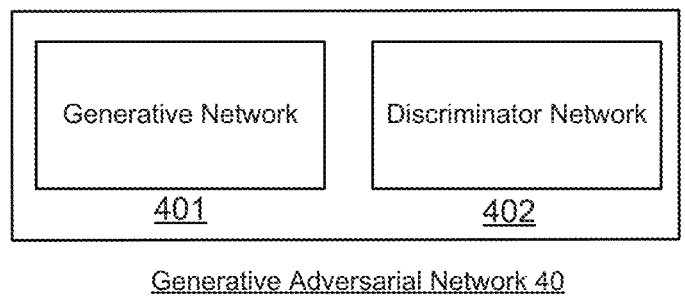
FIG. 1C illustrates an example embodiment of the generative adversarial network associated with each style transfer in FIG. 1B.

FIG. 1C illustrates an example embodiment of the generative adversarial network associated with each style transfer in FIG. 1B. As depicted in the figure, a GAN 400 includes a generative network 401 and a discriminator network 402. As described above, the generative network 401 creates new content and the discriminator network 402 determines if the content generated by the generative network 401 is a real image or the generated content. Neural networks, which may or may not contain GANs, may be utilized for style transfer. In some examples, only the generative network 401 of the GAN 400 may be configured for style transfer. In such examples, the discriminator network 402 is not needed. Further, after a period of time, the generative network 401 is able to generate content that can deceive the discriminator network 402 into determining that the generated content is a real image.

Figure 2A:
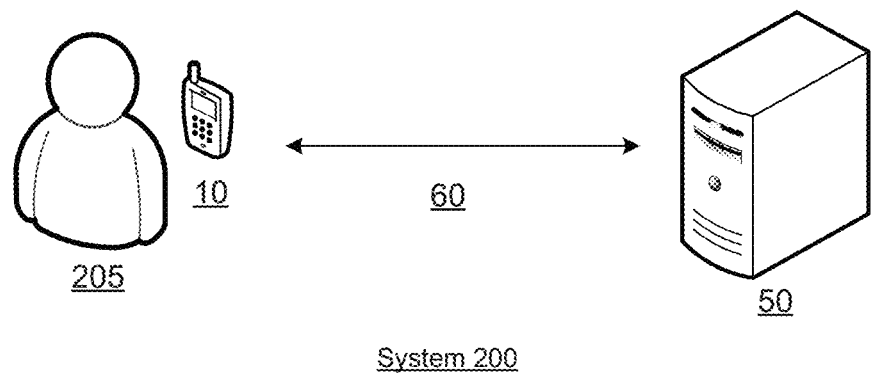
FIG. 2A illustrates another example embodiment of a system employing dynamic modification of image and video content.
Figure 2B:
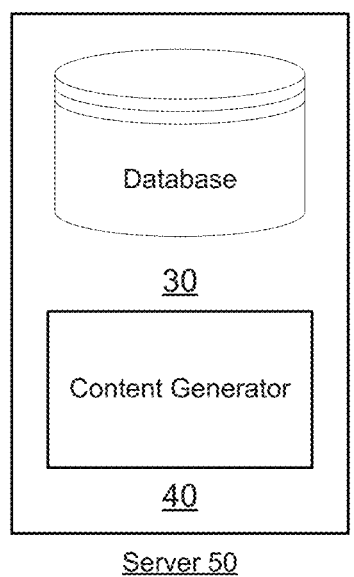
FIG. 2B illustrates an example embodiment of the server depicted in FIG. 2A.

FIG. 2A illustrates another example embodiment of a system employing dynamic modification of image and video content. In an embodiment, FIG. 2A depicts a user 205 using the client device 10 as well as a server 50. In an embodiment, the client device 10 may communicate with the server 50 by any form or medium of digital data communication, e.g., a communication network 60. Examples of a communication network 60 include a local area network (LAN) and a wide area network (WAN), e.g., the Internet. In an embodiment, the server 50 is similar to 20 except that it also includes the database 30 and the content generator 40 as depicted in FIG. 2B.

FIG. 3 illustrates an example embodiment of a method for dynamically modifying image and video content. As depicted in the figure, in a first step 301, it is determined if a certain user (e.g., user 205) accesses certain content (e.g., website, television channel, video game, etc.) at the client device 10. If the answer to step 301 is yes, then the method proceeds to step 302. Otherwise, the method stays on step 301. In step 302, the client device 10 generates and transmits a request for customized content 41 from the server 20 (or the server 50). Then, in step 303, based on the request for customized content 41 from the client device 10, the server 20 (or the server 50) queries and retrieves the content template 31 and user preference information from the database 30. In an embodiment, as described above, the user preference information can be accessed from browser cookies stored on the database 30. For example, the server 20 (or the server 50) may retrieve browser activity as well as other personal information indicating the user 205's age. Then, in step 304, the server 20 (or the server 50) requests the customized content 41 from the content generator 40 based on the user preference information (e.g., age) and the content template 31. Then, in step 305, based on the user preference information, the content generator 40 applies a corresponding style transfer to the content template 31 to generate the customized content 41. For example, if the user preference information indicates that the user 205 is a child, a style transfer associated with one of a cartoon or anime transformation may be applied to the content template 31. The generated customized content 41 is then transmitted back to the client device 10, where it may be activated by the client device 10 as described in step 306. As such, the generated customized content 41 may then be displayed to the user 205.

Figure 4:
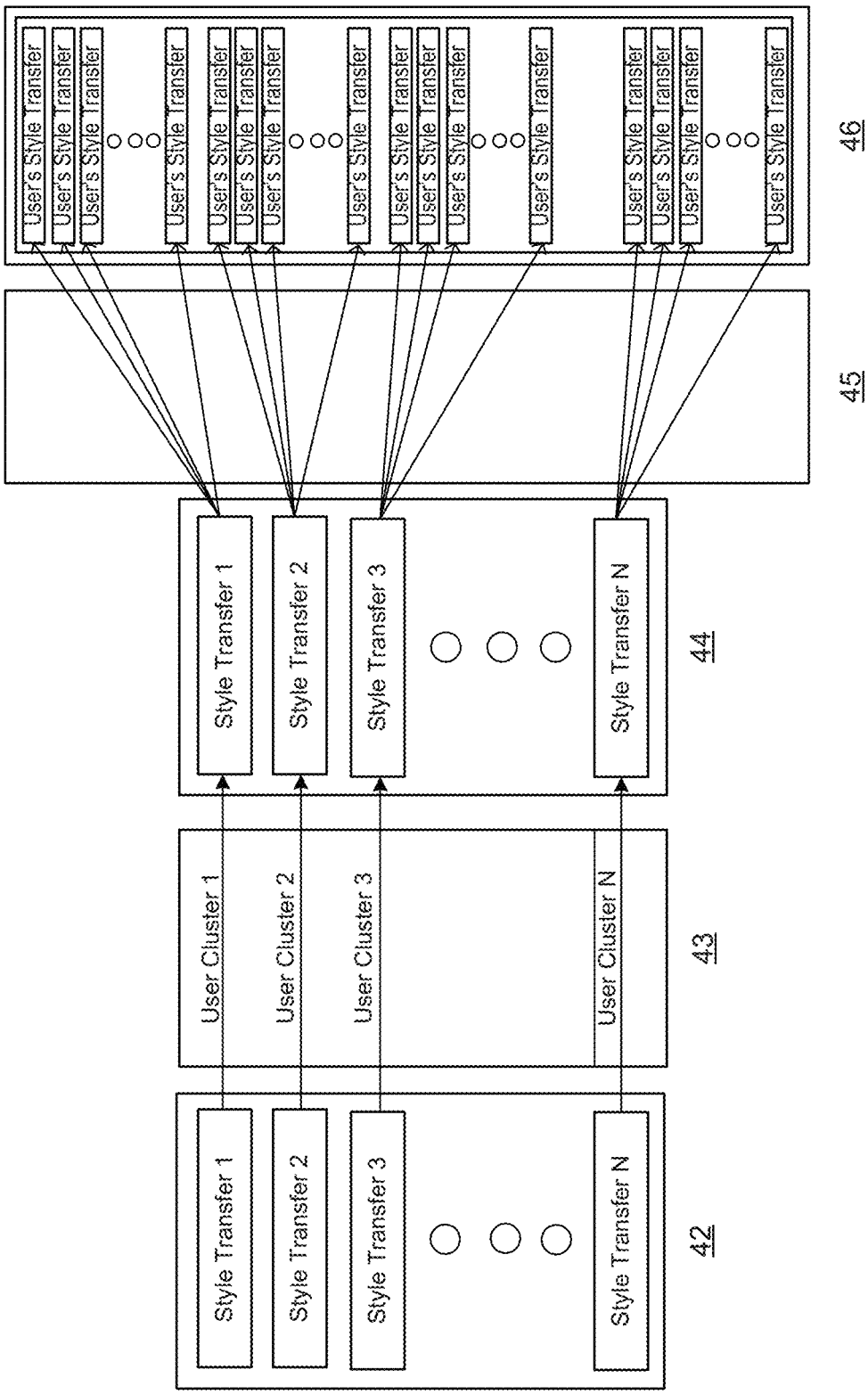
FIG. 4 illustrates an example embodiment of a training process.

FIG. 4 illustrates an example embodiment of a flow of a training process. For example, each of the style transfers of base style transfer 42 may be trained based on a user cluster style transfer training 43 to yield a user cluster enhanced style transfer 44. As illustrated, user personalized style transfers 46 may be obtained through user style transfer training 45 from one or more style transfers of a user cluster enhanced style transfer 44. Thus, the user cluster enhanced style transfer 44 may be derived via user cluster style transfer training 43 from a given base style transfer 42. The users may be clustered and may either have a group style transfer or individual style transfer.

Figure 5:
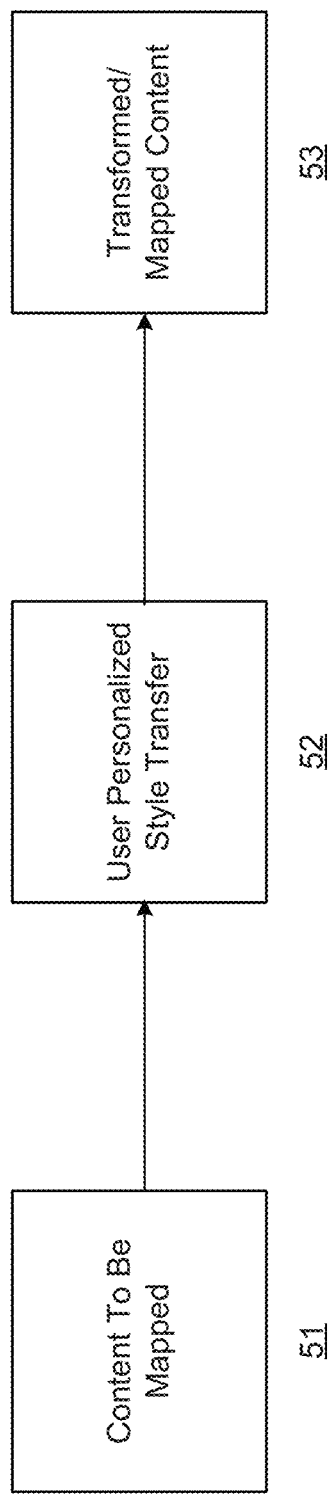
FIG. 5 illustrates an example embodiment of mapping a user personalized style transfer.

FIG. 5 illustrates an example embodiment of mapping a user personalized style transfer. As illustrated, this figure depicts how content is mapped inside a style transfer. In some examples, the content 51 to be mapped may include a video. In other examples, the content to be mapped 51 may include an image. Yet in other examples, the content 51 to be mapped may include any combination of a video and an image, including one or more videos and one or more images. If the content 51 comprises a video, one or more frames of the video may be fed one by one. For example, the one or more video frames may be fed consecutively for user personalized style transfer 52 for a resultant transformed or mapped content 53 based on the user personalized style transfer.

As previously explained, the customized content may be requested from a content generator by a server based on user preference information and content template. The content template may comprise a video, an image, or a combination thereof. If the content template is an image, a style transfer is applied to that individual image. However, if the content template is a video, the style transfer may be applied to each individual video frame of the content template. For example, the style transfer can be applied to each video frame consecutively. However, in another embodiment, the style transfer can be applied simultaneously to a number of video frames. For example, in an embodiment, because each frame transformation image can be considered independent of the other image transformation processes within the video, if multiple parallel systems are running with the same style transfer, each individual frame can be processed in parallel. The customized content may be generated by applying a style transfer to the content template. Thus, the mapping allows for the transformation from the template content 51, including but not limited to a templated image, to the desired style content 53, including but not limited to a desired style image.

Figure 6:
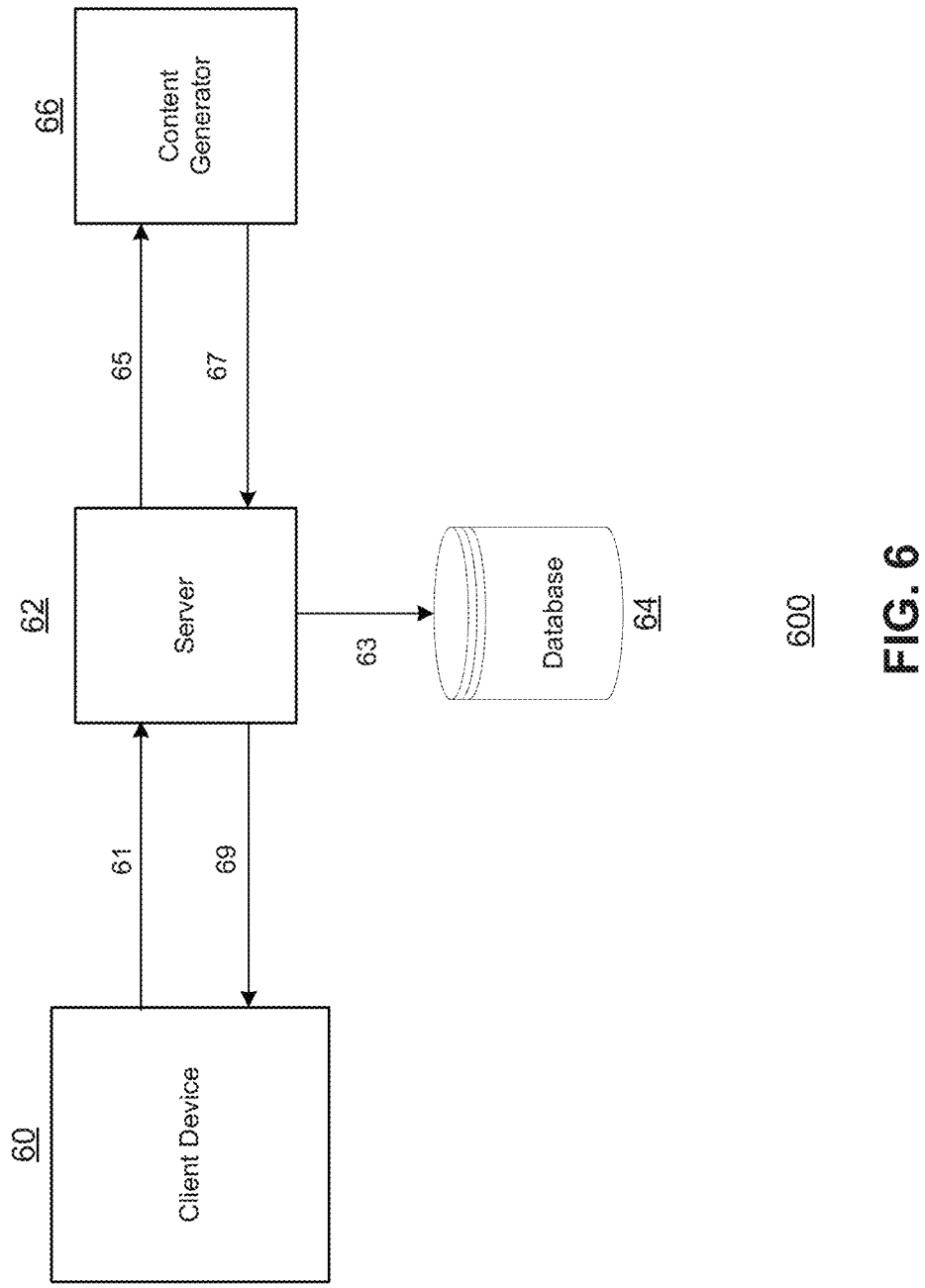
FIG. 6 illustrates an example embodiment of a system configured to process customized content.

FIG. 6 illustrates an example embodiment of a system configured to process customized content. System 600 may comprise a client device 60, one or more servers 62, one or more databases 64, and content generator 66. In some examples, system 600 may reference same or similar components and/or functionalities of system 100 as illustrated in FIG. 1A. In some examples, content generator 66 may be internal to the one more servers 62. In other examples, content generator 66 may be external to the one or more servers 62. In other examples, the content generator 66 may be internal to the client device 60.

Client application comprising instructions for execution on client device 60 may be configured to access content by transmitting one or more requests. At 61, client application of client device 60 may be configured to transmit one or more requests to one or more servers 62 for content. The one or more servers 62 may be configured to receive the one or more requests from client application of client device 60. In some examples, user input via client device 60 may be associated with one or more parameters for database 64 querying of the user preference information. Without limitation, the one or more parameters may include at least one selected from the group of location data, themes data (e.g. Southwestern), ethnicity data, age data, gender data, and/or any combination thereof. In some examples, the one or more parameters may be displayed on client device 60 via client application after selection of a button, such as a click button, via an interface, such as a GUI. In other examples, the one or more parameters may be displayed on client device 60 from a drop-down menu interface. In other examples, a free form text entry field from an interface may be presented to the user on client device 60, with user input parsed for one or more keywords for the database 64 query. The content template may be associated with the one or more parameters. For example, if a Southwestern theme was selected or otherwise provided as user input via client device 60, one or more associated keywords may be queried in the database 64 via one or more servers 62 to provide content that is, responsive to the selection, analogous to the Southwestern theme. In another example, selected input of a Western style genre would result in the server 62 formulating a query based on the selected input. A user may provide input, via client device 60, which may be parsed into a summary of their interests, and keywords associated with this summary may be looked up for matching as part of the database 64 query.

At 63, based on the one or more requests from client application of client device 60, the one or more servers 62 may be configured to query one or more databases 64 for user preference and content. The server 62 may receive a request for customized content from the client application of client device 60, query the database 64 for user preference information and a content template, and request customized content from the content generator 66 based on the user preference information and the content template. The database 64 may be configured to store user preference and personal information. For example, the database 64 may be configured to store browser cookies. Further, the database 64 may also be configured to access a plurality of content templates to be used in generating the additional content with the content generator 66. In an embodiment, the content template may be a live video. In another embodiment, the content template may be a bare-bones image.

At 65, the one or more servers 62 may be configured to transmit one or more requests for customized content from content generator 66 based on the query. In some examples, a request may include content and user personalized style transfer.

At 67, the content generator 66 may be configured to, responsive to the one or more requests from the one or more servers 62, transmit the customized content to the one or more servers 62. The content generator 66 may receive a content template in order to generate a plurality of content types. Specifically, the content generator 66 may be configured to apply a certain style transfer to the content template in order to generate a corresponding content type. As explained above, in an embodiment, the content template may comprise a video or an image. Further, the server 62 may also receive the generated customized content from the content generator 66, and then transmit the generated customized content to the client application of client device 60.

At 69, the one or more servers 62 may be configured to transmit the customized content to the client application of the client device 60. Upon receipt, the client device 60 may display or play the customized content automatically or upon instruction by the user.

In some examples, the content generator 66 may be internal to the client device 60. In these examples, the client device 60 may contain the content generator 66 in memory, and the client device 60 may receive the template image from the server 62. The client device 60 and content generator 66 operate to convert and display the customized content. The template provided by the server 62 to the client device 60 may be the same template as sent to other devices, and the client device 60 and stored content generator 66 may apply a particular, local, and/or customized style transfer. The client device 60 may also communicate directly with the database 64 if necessary (e.g., to obtain additional information to perform the style transfer).

In other examples, the content generator 66 may be internal to the server 62. In these examples, the server 62 may provide the template to the content generator 662 along with the style transfer that the content generator 66 may use to generate the customized content. The customized content may then be provided by the server 62 to the client device 60.

In other examples, the content generator 66 may be stored outside of both the client device 60 and the server 62, for example, in a different server or a different client device. In these examples, the content generator 66 can be in communication with the server 62 and the client device 62 as necessary.

The term "content" is used throughout this specification and it is understood that content can include any type of audio or visual content. For example, content can include, without limitation, images, videos, sounds, songs, television programs, radio programs, movies, three-dimensional videos, Internet streams, video games, and broadcasts.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage, integrated with or separate from database 30. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

In the foregoing Description of Embodiments, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of Embodiments, with each claim standing on its own as a separate embodiment of the invention.

Moreover, it will be apparent to those skilled in the art from consideration of the specification and practice of the present disclosure that various modifications and variations can be made to the disclosed systems without departing from the scope of the disclosure, as claimed. Thus, it is intended that the specification and examples be considered as exemplary only, with a true scope of the present disclosure being indicated by the following claims and their equivalents.

The invention claimed is:

1. A system for dynamically modifying content based on user preferences, the system comprising:
   a client device;
   a server computer comprising a processor and a memory;
   a database containing user preference information and one or more content templates; and
   a content generator software application comprising a plurality of generative adversarial networks, wherein:
   each generative adversarial network is associated with a corresponding style transfer, each generative adversarial network is a generative adversarial network trained on a paired dataset, wherein:
the paired dataset comprises a plurality of inputted images, and
each of the plurality of inputted images is mapped to an image in a target domain,
each style transfer is trained by the corresponding generative adversarial network, and
the content generator software application is configured to apply one or more style transfers to a content template to convert the content template into a desired content type;
wherein, upon receipt of a request for customized content associated with a user, the server computer is configured to:
query the database for user preference information associated with the user and a corresponding content template, and
request the customized content from the content generator software application based on the user preference information and the corresponding content template; and
upon receipt of the request from the server computer, the content generator software application is configured to:
retrieve a style transfer from the database, and
apply the style transfer to the corresponding content template to generate the customized content based on the user preference information, and, and
wherein the style transfer is a user personalized style transfer associated with the user preference information and obtained through a user style transfer training from one or more user cluster enhanced style transfers, and each of the one or more user cluster enhanced style transfers is derived via a user cluster style transfer training from a given base style transfer.

2. The system of claim 1, wherein the style transfer comprises a plurality of style transfers.

3. The system of claim 1, wherein the server computer is further configured to:
receive the generated customized content, and
transmit the generated customized content to the client device.

4. The system of claim 1, wherein:
each generative adversarial network includes a generative network and a discriminator network, and
each generative adversarial network is trained on distinct training data.

5. The system of claim 1, wherein the style transfer is one of a live-action modification to the corresponding content template, an animated modification to the corresponding content template, and at least one color modification to the corresponding content template.

6. The system of claim 5, wherein the corresponding content template includes a plurality of video frames, wherein the style transfer is applied to each video frame of the corresponding content template.

7. The system of claim 6, wherein the style transfer is applied to at least two video frames simultaneously.

8. The system of claim 1, wherein wherein the user preference information corresponds to an age range of the user.

9. The system of claim 1, wherein at least two generative adversarial networks are associated with a particular style transfer.

10. A method for dynamically modifying content based on user preferences, the method comprising:
generating, at a processor, a request for customized content from a server computer;
querying, with the server computer, a database for user preference information and a corresponding content template for the customized content;
requesting, with the server computer, the customized content from a content generator software application based on the user preference information and the corresponding content template, wherein:
the content generator software application comprises a plurality of generative adversarial networks, wherein each generative adversarial network is associated with a corresponding style transfer, and
each generative adversarial network is a generative adversarial network trained on a paired dataset, wherein:
the paired dataset comprises a plurality of inputted images, and
each of the plurality of inputted images is mapped to an image in a target domain;
retrieving, by the content generator, a style transfer from the database; and
applying, at the content generator software application, the style transfer to the corresponding content template to generate the customized content based on the user preference information, and
wherein the style transfer is a user personalized style transfer associated with the user preference information and obtained through a user style transfer training from one or more user cluster enhanced style transfers, and each of the one or more user cluster enhanced style transfers is derived via a user cluster style transfer training from a given base style transfer.

11. The method of claim 10, further comprising:
receiving, with the server computer, the generated customized content, and
transmitting, with the server computer, the generated customized content to the processor.

12. The method of claim 11, further comprising:
activating, with the processor, the generated customized content, wherein the activating includes displaying the generated customized content to a user.

13. The method of claim 12, further comprising:
deleting, with the processor, the generated customized content after it is displayed to the user.

14. The method of claim 10, wherein the request for customized content is generated upon determining that a user accessed certain content, wherein the certain content is one of a website, a television channel, or a video game.

15. The method of claim 10, wherein the user preference information corresponds to an age range of a user.

16. The method of claim 15, wherein the corresponding content template includes a plurality of video frames, wherein the style transfer is applied to each video frame of the content template.

17. The method of claim 16, wherein the style transfer is applied to at least two video frames simultaneously.

18. The method of claim 10, wherein the corresponding content template is one of a video or an image.

19. The method of claim 18, wherein the video is live-action.

20. A system for dynamically modifying content based on user preferences, the system comprising:

a server computer including a plurality of generative adversarial networks, wherein:
  each generative adversarial network is a generative adversarial network trained on a paired dataset, wherein:
    the paired dataset comprises a plurality of inputted images, and
    each of the plurality of inputted images is mapped to an image in a target domain, and
  each generative adversarial network is associated with a corresponding style transfer; and
a mobile device including a processor configured to:
  determine that a user accessed certain content at the mobile device, and
  generate a request for customized content from the server computer,
wherein the server computer is configured to retrieve and apply a style transfer to a corresponding content template to generate the customized content based on user preference information of the user, and
wherein the style transfer is a user personalized style transfer associated with the user preference information and obtained through a user style transfer training from one or more user cluster enhanced style transfers, and each of the one or more user cluster enhanced style transfers is derived via a user cluster style transfer training from a given base style transfer.

* * * * *